(12) United States Patent
Karasek et al.

(10) Patent No.: US 12,727,596 B1
(45) Date of Patent: Sep. 8, 2026

(54) PEST REPELLING DEVICE AND SYSTEM

(71) Applicants: Justin Karasek, Murrieta, CA (US); Jasha Karasek, Portland, OR (US)

(72) Inventors: Justin Karasek, Murrieta, CA (US); Jasha Karasek, Portland, OR (US)

( * ) Notice: Subject to any disclaimer, the term of this patent is extended or adjusted under 35 U.S.C. 154(b) by 25 days.

(21) Appl. No.: 18/904,213

(22) Filed: Oct. 2, 2024

Related U.S. Application Data

(60) Provisional application No. 63/542,601, filed on Oct. 5, 2023.

(51) Int. Cl.
*A01M 29/18* (2011.01)

(52) U.S. Cl.
CPC ....... *A01M 29/18* (2013.01); *A01M 2200/012* (2013.01)

(58) Field of Classification Search
CPC ........................ A01M 29/18; A01M 2200/012
See application file for complete search history.

(56) References Cited

U.S. PATENT DOCUMENTS 6,325,084 B1 * 12/2001 Cohen .................. F04D 25/088 417/313
12,213,475 B1 * 2/2025 Wang .................. A01M 1/2016
2003/0137258 A1 * 7/2003 Piepgras ................ H05B 45/20 315/312
2014/0098643 A1 * 4/2014 Power ................... A01M 29/18 367/139

FOREIGN PATENT DOCUMENTS

CN 209959501 U * 1/2020
CN 214482972 U * 10/2021
EP 4176716 A1 * 5/2023 ............ A01M 1/023
KR 20110000279 U * 1/2011 ........... F04D 29/644
KR 20190140821 A * 12/2019 .............. F24F 11/56

OTHER PUBLICATIONS

Beflans website May 30, 2023 retrieved from waybackmachine ()https://web.archive.org/web/20230530144856/https://belfans.com/ (Year: 2023).*
Comparable Products for Patent Office from Inventor (5 pages).

* cited by examiner

*Primary Examiner* — Rufus C Point
(74) *Attorney, Agent, or Firm* — Plager Schack LLP; Mark H. Plager; Naomi Mann

(57) ABSTRACT

Disclosed is a pest repelling fan, comprising reflective fan blades, and an ultrasound emitting system configured to produce sound waves that disturb and/or deter pests. In certain embodiments, the targeted pests are flies.

13 Claims, 2 Drawing Sheets

10
28
12B
10
14
14
12

26

10
24
12A 22
10
14
16
14
12
18
26
20
24

PEST REPELLING DEVICE AND SYSTEM

RELATED APPLICATION

This application claims benefit to U.S. Application No. 63/542,601 filed Oct. 5, 2023, which is incorporated by reference herein in its entirety.

BACKGROUND

The present disclosure relates generally to pest repellant devices and systems, and in particular to a pest repellant fan.

SUMMARY

According to various embodiments, disclosed is a pest repelling fan, comprising reflective fan blades, and an ultrasound emitting system configured to produce sound waves that disturb and/or deter pests. In certain embodiments, the targeted pests are flies.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figures 1, 2:
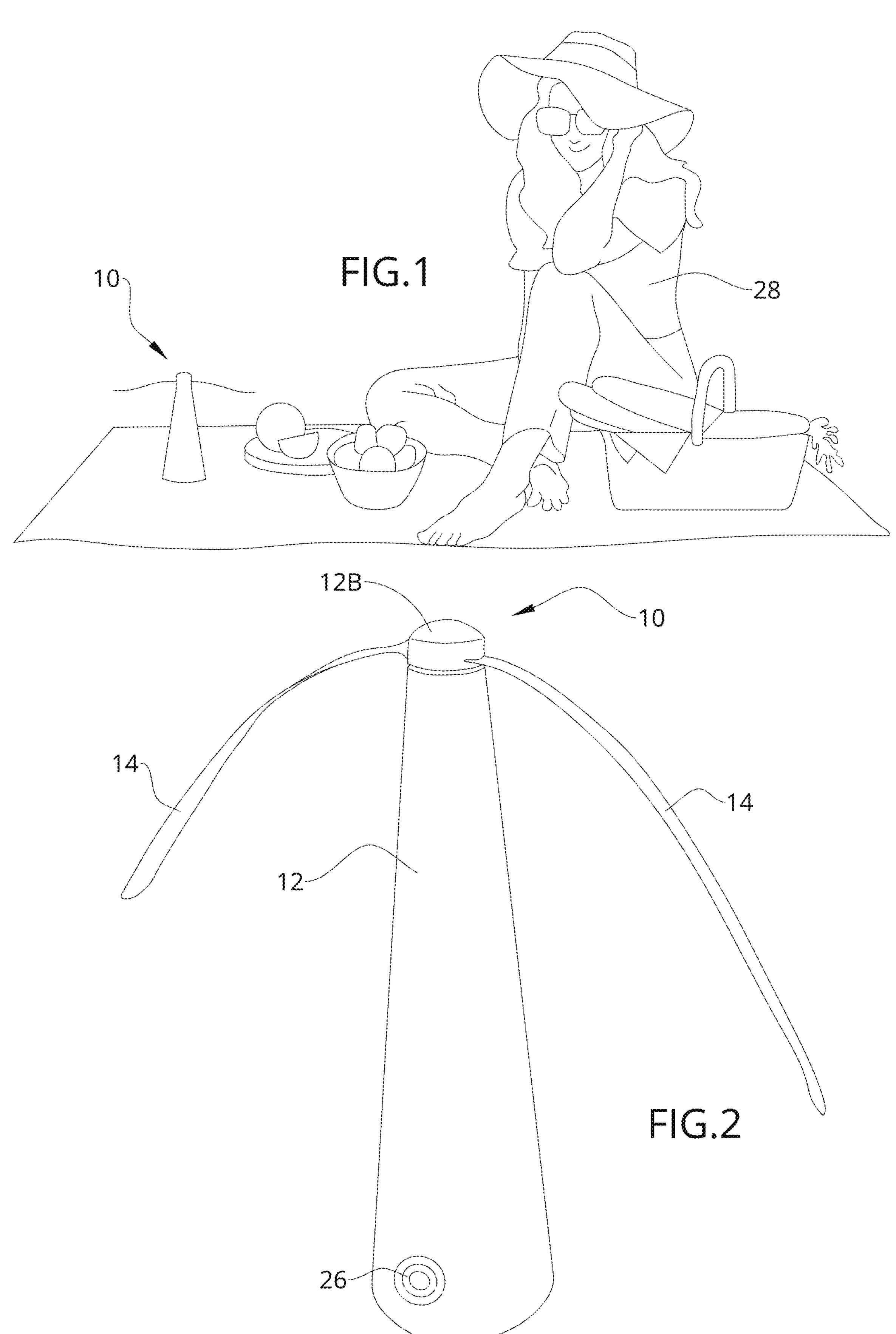
FIG. 1 is a perspective view of a fly repelling fan shown in use, according to certain embodiments.
FIG. 2 is a perspective view of the fly repelling fan of FIG. 1, according to certain embodiments.
Figures 3, 4:
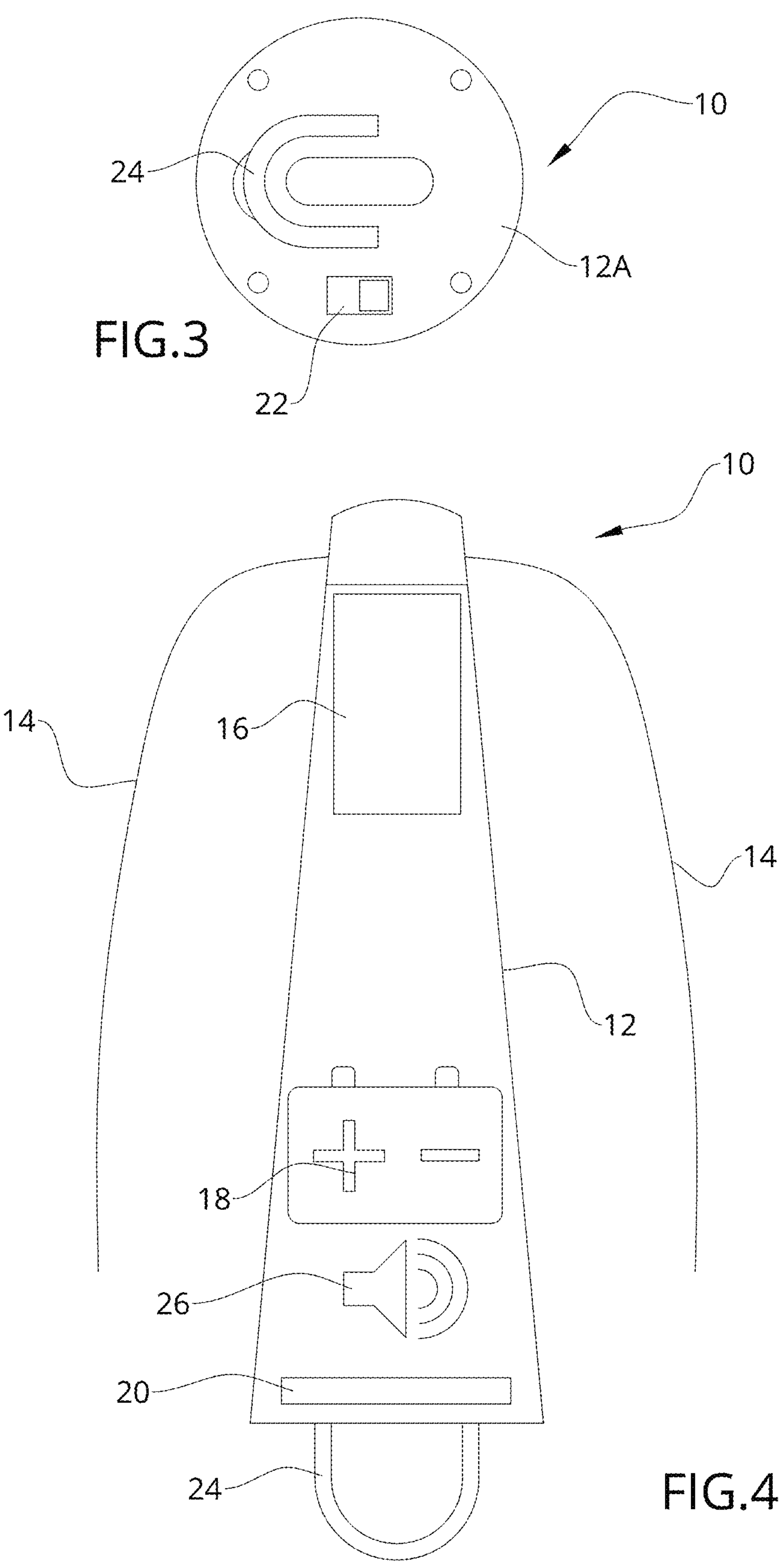
FIG. 3 is a bottom view of the fly repelling fan.
FIG. 4 is a schematic view of the fly repelling fan.

According to various embodiments, disclosed is a device and system for repelling pests such as flies and other flying insects, comprising a fan 10 including reflective fan blades 14, and an ultrasound speaker system 26 configured to produce ultrasonic waves designed to deter pests.

In certain embodiments, fan 10 may be designed to particularly repel flies. In some embodiments, fan 10 includes a housing 12 which supports blades 14, ultrasound speaker system 26, and other components such as a fan motor 16, a power source system such as a battery housing and battery 18, circuitry/wiring components 20 which may include a circuit board, and a switch system which may comprise a power button, i.e., on/off switch 22. In certain embodiments, housing 12 may have an elongated profile, which may comprise a cone or frustoconical geometry as depicted in the figures, but not necessarily so.

Housing 12 may have a flat bottom surface, which may be enclosed by a base plate 12A that may be screwed-on or clipped-on component of the housing, to allow fan 10 to be supported on a tabletop or other surface. In some embodiments, base plate 12A may be weighted for added stability. Additionally, battery 18, circuit board 20 and other circuitry/wiring components, and ultrasound speaker system 26 may be provided within a bottom section of housing 12 for additional stability. In some embodiments, housing 12 may incorporate a fan blade top cover 12B configured to cover fan blades 14. In some embodiments, housing 12 may comprise a hanging hook 24 allowing fan to optionally be hung from a nail/hook in a wall. It shall be appreciated that different support element may be used in alternate embodiments. In further embodiments, battery 18 may be a rechargeable lithium or similar battery, or can be plugged into DC power connection with the same type c power cord used for charging. In one embodiment, battery 18 may be a 1×3.7V 18650 lithium 1200 mAh built in battery. In some embodiments, fan 10 may include a USB port for powering fan 10 and/or recharging battery 18. In further embodiments, fan 10 may include an LED Light (e.g., a red light) to indicate low battery voltage and/or that the battery needs recharging, and a green light to indicate a sufficient or fully charged battery.

In certain embodiments, reflective fan blades 14 may be reflective non-rigid fan blades, which are made from a soft material such as a thin plastic or foam, and are designed to automatically stop spinning upon contact. Fan motor 16 is configured to drive a rotation of blades 14 and is coupled to circuit board 20 via wiring, wherein circuit board 20 controls functioning of the various system components. In certain embodiments, blades 14 may have a flat profile, but not necessarily so. In certain embodiments, the top and/or bottom surfaces of blades 14 may be coated with patches of reflective material, or blades 14 may be entirely reflective in other embodiments. In certain embodiments, blades 14 are configured to rotate at a soft and gentle speed that creates airflow and disrupts the aroma trail of food. In one embodiment, blades may rotate at a speed of around 270 rounds per minute. In some embodiments, a variable speed control element may be provided for varying the speed of the blades, but not necessarily so. In one embodiment, blades 14 are supported on a top section of the housing, and in perpendicular alignment to its major axis. As such, the axis of rotation of rotation of blades 14 is the major axis of housing 12.

In certain embodiments, ultrasound speaker system 26 may incorporate an ultrasonic speaker within a housing enclosure through which high frequency sound waves are emitted for repelling pests. The ultrasonic frequencies emitted are generally disturbing to pests to cause them to leave the area. In one embodiment, sound waves may be at approximately 90 decibels. In some embodiments, the frequency of the sound waves may change between frequencies of about 25 kilohertz to about 45 kilohertz, wherein the frequency gradually increases or decreases between the two values. In some further embodiments, the sound waves may be emitted at intervals. In one embodiment, sound waves are emitted for about 15 seconds, followed by a 15 second interval wherein the sound waves are not emitted. In certain embodiments, the ultrasonic speaker may be located near a bottom section of the housing, but not necessarily so. In some embodiments, ultrasound speaker system 26 and blades 14 may be separately controlled, so that a user may operate either one or both at the same time; in other embodiments, these components may be configured to activate simultaneously (e.g., by pressing on/off switch 22).

A user 28 may place fan 10 in front of him/herself, for example when eating in an area where one or more flies are present. Fan 10 may also be useful in a food serving, food preparation area, food buffet, or the like. As such, fan 10 may be used in a private kitchen or dining area, a social gathering, a restaurant, bar, or other public establishment. The spinning flat reflective blades disrupt the aroma trail of the food, making it challenging for pests to locate the source. Additionally, blades 14 create a visual disturbance that interferes with the flicker fusion rate of flies, further deterring their presence, while the ultrasonic sound serves to annoy and repel flies and other pests but is inaudible to humans. As such, by positioning the device near any food area, it can create a protective zone around food and drinks, effectively deterring pests from approaching and landing on them. In some embodiments, fan 10 may be used to repel cockroaches, mice, ants, silverfish, and other bugs and vermin. Thus, the disclosed subject matter provides a reliable, pet-friendly solution, with a safe design and automatic blade stoppage upon contact, to ensure a pest-free environment for enjoying meals and drinks and maintaining food cleanliness.

It shall be appreciated that the disclosed device and system can have multiple configurations in different embodiments. In some alternate embodiments, fan 10 may comprise additional components and/or systems, such as a timer, a motion sensor, a variable speed control system, remote control functionality, and/or Bluetooth or other components for wireless connection. In some alternate embodiments, fan 10 may incorporate additional pest-deterrent systems, which are or may become available with emerging technology. In other alternate embodiments, fan 10 may be controllable via an App provided on a user's smart phone or other electronic device. In some further alternate embodiments, fan 10 may incorporate solar power components.

Furthermore, it shall be appreciated that the components of the disclosed system may be shuffled, interchanged, or reconfigured in alternate embodiments for achieving the same or similar purpose. As some non-limiting examples, base plate 12A can be replaced with a different stable foundation, such as a weighted stand or a wall-mounted bracket; hanging hook 24 can be repositioned or replaced with an alternative mounting option, such as adhesive strips or a magnetic attachment, to accommodate different installation preferences; the enclosure and speaker of ultrasound speaker system 26 can be modified in size, shape, or placement within the device. In some alternate embodiments, motor 16 can be substituted with a different rotational mechanism that generates sufficient airflow to achieve the desired pest-repelling effect. In some further alternate embodiments, fan blades 14 may be made of different materials and/or have different geometric shapes and various dimensions. Housing 12 may likewise have different geometric shapes and dimensions in alternate embodiments.

The disclosed system provides multiple benefits that effectively disrupt pest behavior, provide enhanced coverage, and eliminate the need for harmful chemicals. Fan 10 is further simply to setup and maintain. The rechargeable battery adds convenience, while the automatic stop feature for the blades ensures the safety of pets and children. Additionally, the soft reflective fan blades not only enhance the visual appeal of the device but also create a visual disturbance that interferes with the flies' flicker fusion rate, making it more challenging for them to identify and settle on food or drinks. The top fan blade housing covers and encloses the fan blades, ensuring their safe operation and directing the airflow generated by the spinning blades in a controlled manner.

It shall be appreciated that the disclosed device and system may be used in other applications and/or in other environments, including for gardening and plant protection; for protecting against mosquitos, bees, and other potentially harmful insects in the home or outdoor environments such as patios, gardens, camping, beaches, lakes, and the like; and/or in garbage areas. In some alternate embodiments, the disclosed system may also be adapted for use in bird deterrence in buildings, traffic lights, airports, agricultural areas, billboards and other signage, etc., wherein the size and/or number of fans used may be based on the type(s) and/or nature of birds that frequent the area. As a bird Deterrent system for buildings, one or more fan(s) 10 may be installed on ledges, rooftops, balconies, windowsills, etc., to create a visually and audibly disturbing environment that deters birds to deter birds from roosting and causing damage or messes. In airports, the disclosed system may increase aircraft safety by reducing the risk of bird strikes, wherein one or more fans 10 may be deployed around airport runways and hangars to keep birds at a safe distance from aircraft. In agricultural applications, the disclose system may be deployed in fields, orchards, vineyards, and the like to protect crops from birds and other pests without harming the crops. On billboards and signage fan(s) 10 may be used to prevent birds from obstructing advertisements and causing damage. In agricultural applications, including gardening, fan(s) 10 may be place near vulnerable plants in fields, gardens, greenhouses, and the like to deter birds as well as other insects, without using harmful chemicals. It shall be appreciated that the disclosed system may be used for deterrence of larger pests and animals, including rodents, from various areas.

Additionally, the reflective fan blades of the disclosed system may provide a dynamic visual element with interesting light reflections and movements to enhance the aesthetic appearance of an environment, while serving a functional purpose. As such, the disclosed system may be used at parties, weddings, and other events to add a unique visual effect. In further embodiments, fan 10 may be adapted for use as a portable personal pest repellent, which may be provided as a smaller version configured to clip to clothing or to be worn as a bracelet, pendant, and the like, for personal protection against pests during outdoor activities such as hiking, camping, picnics, etc. The disclosed fan 10 may further be integrated into various outdoor products such as garden lights, which may be a solar powered system, to protect plants and create a pleasant outdoor ambiance. In further embodiments, fan 10 may be integrated into a smart home system for home automated pest control. Such smart home system may provide users with the ability to control fan 10 remotely via a smartphone app, schedule activation times, and/or monitor pest activity. In some further embodiments, fan 10 may be integrated into window screens in homes, greenhouses RVs, and the like, to keep pests out while allowing fresh air to enter.

It shall be appreciated that the device and system described herein may comprise any alternative known materials in the field and be of any color, size, and/or dimensions. It shall be appreciated that the device may be manufactured and assembled using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A pest repelling fan, comprising:

A fan housing;

reflective fan blades supported on the fan housing;

a fan motor configured to spin the reflective fan blades; and an ultrasound speaker system within the fan housing, the ultrasound speaker system configured to produce ultrasonic waves designed to deter pests, wherein the targeted pests are flies, wherein the pest repelling fan is portable, wherein the fan blades are non-rigid and configured to automatically stop spinning upon contact, wherein the sound waves emitted are at a changing frequency of between 25 to 45 KHZ for repelling flies, and wherein the reflective blades are configured to create a visual disturbance that interferes with a flicker fusion rate of flies.

2. The pest repelling fan of claim 1, wherein the fan housing has an elongated profile.

3. The pest repelling fan of claim 2, wherein the reflective fan blades are supported proximate a top section of the fan housing.

4. The pest repelling fan of claim 2, wherein the fan housing has a conical and/or frustoconical geometry.

5. The pest repelling fan of claim 1, wherein the fan housing has a flat bottom surface.

6. The pest repelling fan of claim 1, further comprising a hanging hook attached to the fan housing, for hanging the fan.

7. The pest repelling fan of claim 1, wherein the sound waves emitted are at approximately 90 decibels.

8. The pest repelling fan of claim 1, wherein the sound waves are emitted at intervals.

9. The pest repelling fan of claim 1, wherein the frequency of the emitted sound waves gradually changes between 25 kilohertz and 45 kilohertz.

10. The pest repelling fan of claim 1, wherein the fan is controllable via an App provided on an electronic device.

11. The pest repelling fan of claim 1, wherein blades may rotate at a speed of around 270 rounds per minute.

12. The pest repelling fan of claim 1, wherein the top and/or bottom surfaces of the fan blades are coated with patches of reflective material.

13. The pest repelling fan of claim 1, wherein the ultrasound speaker system and the fan blades are separately controlled.

* * * * *